US008755333B2

(12) United States Patent
Landau et al.

(10) Patent No.: US 8,755,333 B2
(45) Date of Patent: *Jun. 17, 2014

(54) METHOD AND APPARATUS TO COMPUTE A NOISE POWER ESTIMATE IN A WCDMA NETWORK

(75) Inventors: Uri M. Landau, San Diego, CA (US); Severine Catreux-Erceg, Cardiff, CA (US); Mark Kent, Vista, CA (US); Vinko Erceg, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/620,602

(22) Filed: Sep. 14, 2012

(65) Prior Publication Data

US 2013/0094378 A1    Apr. 18, 2013

Related U.S. Application Data

(63) Continuation of application No. 11/462,547, filed on Aug. 4, 2006, now Pat. No. 8,326,339.

(51) Int. Cl.
*H04W 4/00* (2009.01)

(52) U.S. Cl.
USPC ........................................................ 370/328

(58) Field of Classification Search
None
See application file for complete search history.

(56) References Cited

U.S. PATENT DOCUMENTS

| 6,028,894 | A * | 2/2000 | Oishi et al. ..................... 375/227 |
| 6,347,234 | B1 | 2/2002 | Scherzer |
| 6,515,980 | B1 * | 2/2003 | Bottomley ..................... 370/342 |
| 8,326,339 | B2 | 12/2012 | Landau et al. |
| 2002/0101832 | A1 | 8/2002 | Chen et al. |
| 2003/0003939 | A1 | 1/2003 | Banerjee |
| 2003/0072392 | A1 * | 4/2003 | Beadle et al. ................. 375/316 |
| 2003/0076871 | A1 | 4/2003 | Abrishamkar et al. |
| 2004/0091025 | A1 | 5/2004 | Sindhushayana et al. |
| 2004/0091034 | A1 | 5/2004 | Shiu et al. |

(Continued)

FOREIGN PATENT DOCUMENTS

| CN | 1322418 | 11/2001 |
| EP | 1821423 A1 | 8/2007 |
| EP | 1865617 A1 | 12/2007 |
| KR | 20010028160 | 4/2001 |

OTHER PUBLICATIONS

European Search Report for European Application No. EP 07 00 5499 dated Mar. 17, 2010 (6 pages).

(Continued)

*Primary Examiner* — Otis L Thompson, Jr.
(74) *Attorney, Agent, or Firm* — Sterne, Kessler, Goldstein & Fox P.L.L.C.

(57) ABSTRACT

Method and apparatus for computing a noise power estimate in a wideband CDMA (WCDMA) network are disclosed and may include calculating a noise power estimate for a downlink channel based on an orthogonal sequence generated for a transmitted signal. The orthogonal sequence may be generated based on a slot number of the transmitted signal and/or a transmit diversity mode used for the transmitted signal. A portion of a plurality of dedicated physical channel (DPCH) pilot bits for the downlink channel may be summed to generate an in-phase (I) component and a quadrature (Q) component. The generated I component and the generated Q component may be multiplied by the orthogonal sequence to generate at least one noise I component and at least one noise Q component.

20 Claims, 5 Drawing Sheets

(56) References Cited

U.S. PATENT DOCUMENTS

| | | |
|---|---|---|
| 2005/0245196 A1 | 11/2005 | Diaz Fuente et al. |
| 2005/0276248 A1 | 12/2005 | Butala et al. |
| 2007/0049205 A1 | 3/2007 | Moloudi et al. |
| 2007/0201539 A1* | 8/2007 | Yu et al. .................. 375/148 |
| 2007/0281624 A1 | 12/2007 | Thomas et al. |
| 2008/0026763 A1 | 1/2008 | van Rensburg et al. |
| 2008/0075158 A1 | 3/2008 | Li |
| 2009/0034598 A1 | 2/2009 | Catreux-Erceg |
| 2010/0119001 A1 | 5/2010 | Walton et al. |
| 2011/0158293 A1 | 6/2011 | Shiu et al. |

OTHER PUBLICATIONS

Nabdendorpe, Luc, WCDMA for UMTA, Universite catholique de Louvain, p. 10 (49 pages).

* cited by examiner

METHOD AND APPARATUS TO COMPUTE A NOISE POWER ESTIMATE IN A WCDMA NETWORK

CROSS-REFERENCE TO RELATED APPLICATIONS

This application is a continuation of U.S. Non-Provisional application Ser. No. 11/462,547, filed Aug. 4, 2006, which is hereby expressly incorporated by reference in its entirety.

This application also makes reference to:
U.S. application Ser. No. 11/355,110, filed on Feb. 15, 2006;
U.S. application Ser. No. 11/355,222, filed on Feb. 15, 2006;
U.S. application Ser. No. 11/355,109, filed on Feb. 15, 2006;
U.S. application Ser. No. 11/355,111, filed on Feb. 15, 2006; and
U.S. application Ser. No. 11/422,689, filed on Jun. 7, 2006.

Each of the above state applications is hereby incorporated herein by reference in its entirety.

FIELD OF THE INVENTION

Certain embodiments of the invention relate to wireless communication. More specifically, certain embodiments of the invention relate to a method and apparatus for computing a noise power estimate in a wideband CDMA (WCDMA) network.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

In the case of a WCDMA downlink, multiple access interference (MAI) may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths after despreading, causing MAI. The level of intra-cell interference depends strongly on the channel response. In nearly flat fading channels, the physical channels remain almost completely orthogonal and intra-cell interference does not have any significant impact on the receiver performance. Frequency selectivity is common for the channels in WCDMA networks.

Mobile networks allow users to access services while on the move, thereby giving end users freedom in terms of mobility. However, this freedom does bring uncertainties to mobile systems. The mobility of the end users causes dynamic variations both in the link quality and the interference level, sometimes requiring that a particular user change its serving base station. This process is known as handover (HO). Handover is the essential component for dealing with the mobility of end users. It guarantees the continuity of the wireless services when the mobile user moves across cellular boundaries.

WCDMA networks may allow a mobile handset to communicate with a multiple number of cell sites. This may take place, for example, for a soft-handoff from one cell site to another. Soft-handoffs may involve cell sites that use the same frequency bandwidth. On occasions, there may be handoffs from one cell site to another where the two cell sites use different frequencies. In these cases, the mobile handset may need to tune to the frequency of the new cell site. Additional circuitry may be required to handle communication over a second frequency of the second cell site while still using the first frequency for communicating with the first cell site. The additional circuitry may be an undesirable extra cost for the mobile handset. In addition, the mobile handset may require different transmit power to establish and maintain a communication link with the new cell site. In a handoff scenario, the mobile handset may still be receiving a strong signal from the current cell site and a weaker signal from the new cell site. In this regard, transmit power may have to be adjusted so that the handoff may be achieved and the mobile handset may begin to communicate with the new cell site. Conventional methods of calculating noise power utilize mean and/or variance, which results in a biased estimate of the noise power. Such biased estimates are often times inaccurate.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus for computing a noise power estimate in a wideband CDMA (WCDMA) network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and apparatus for computing a noise power estimate in a wideband CDMA (WCDMA) network, and may include calculating a noise power estimate for a downlink channel based on an orthogonal sequence generated for a transmitted signal. The orthogonal sequence may be generated based on a slot number of the transmitted signal and/or a transmit diversity mode used for the transmitted signal. A portion of a plurality of dedicated physical channel (DPCH) pilot bits for the downlink channel may be summed to generate an in-phase (I) component and a quadrature (Q) component. The generated I component and the generated Q component may be multiplied by the orthogonal sequence to generate one or more corresponding I and Q noise components. The generated corresponding I and Q noise components may be summed and the resulting I and Q summed components squared, to yield corresponding I and Q noise components. The squared I and Q noise components may be summed and then normalized to yield a noise power estimate for the downlink channel. The normalizing may comprise dividing the generated summed noise component by a number of dedicated pilot bits per slot of the downlink channel.

Figure 1A:
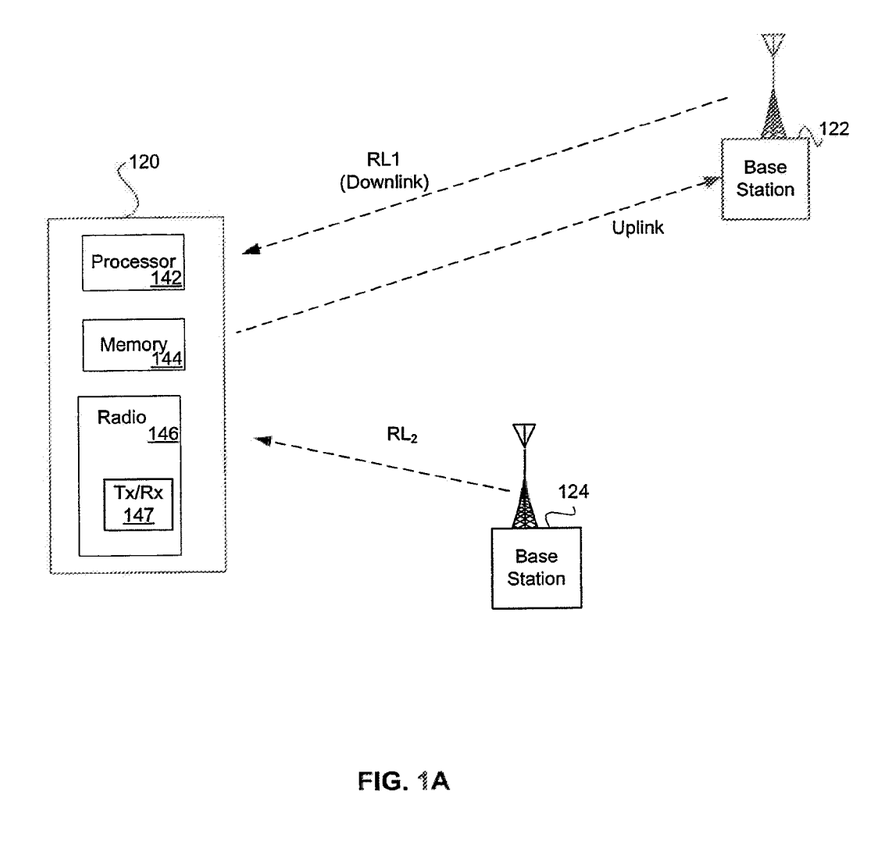
FIG. 1A is an exemplary diagram illustrating a WCDMA handset communicating with two WCDMA base stations, in accordance with an embodiment of the invention.

FIG. 1A is an exemplary diagram illustrating a WCDMA handset communicating with two WCDMA base stations, in accordance with an embodiment of the invention. Referring to FIG. 1A, there is shown a mobile handset or user equipment 120, a plurality of base stations BS 122 and BS 124, and a plurality of radio links (RL), $RL_1$ and $RL_2$ coupling the user equipment 120 with the base stations BS 122 and BS 124, respectively. The user equipment 120 may comprise a processor 142, a memory 144, and a radio 146. The radio 146 may comprise a transceiver (Tx/Rx) 147.

In accordance with an embodiment of the invention, methods for processing a plurality of dedicated physical channel (DPCH) pilot bits for the downlink channel disclosed herein may apply to diversity and non-diversity wireless systems. Diversity wireless systems may comprise space-time transmit diversity (STTD), closed loop 1 (CL1), and closed loop 2 (CL2) wireless systems.

Uplink power control (PC) is of paramount importance for CDMA-based systems because the capacity of such a system is a function of the interference level. The power transmitted by all active user equipments (UE) within a network may be controlled to limit interference levels and alleviate well-known problems such as the "near-far" effect. If there is more than one user active, the transmitted power of non-reference users is suppressed by a factor which may depend on the partial cross-correlation between the code of the reference user and the code of the non-reference user. However, when a non-reference user is closer to the receiver than the reference user, it is possible that the interference caused by this non-reference user has more power than the reference user also referred to as the "near-far" effect. A UE may utilize open-loop power-control to measure its received signal power and adjusts its transmit power accordingly. An active radio link (RL) may utilize closed-loop power-control to measure the received signal power from all user equipments and command individual user equipments to raise or lower their transmit uplink power such that the received signal-to-noise ratio (SNR) from all user equipments at the radio links is the same.

The processor 142 may communicate and/or control a plurality of bits to/from the base stations BS 122 and BS 124. The memory 144 may comprise suitable logic, circuitry, and/or code that may store data and/or control information. The radio 146 may comprise transmit circuitry and/or receive circuitry that may be enabled to calculate a signal-to-noise ratio (SNR) and/or a noise power estimate of a downlink dedicated physical channel (DPCH) based on a plurality of transmit power control (TPC) bits and/or a plurality of dedicated pilot bits received via the downlink dedicated physical channel (DPCH), where the plurality of TPC bits may not be known when they are received. The radio links that belong to the same radio link set may broadcast the same values of transmit power control (TPC) bits. The radio links that belong to different radio link sets may broadcast different TPC bits. The user equipment 120 may receive TPC bits via multiple radio links, for example, $RL_1$ and $RL_2$ simultaneously. During handover, the user equipment 120 may simultaneously receive signals from multiple radio link sets.

The WCDMA specification defines the physical random access channel (PRACH) for mobile phone uplinks and the acquisition indicator channel (AICH) for BTS downlinks. Communication is established when the user equipment 120 completes its search for a base station, for example, BS 122 and synchronizes its PRACH uplink signal with the BTS AICH downlink signal. The base station may recognize a resulting PRACH preamble from the user equipment 120 and responds with an AICH to establish a communication link. The user equipment 120 may use the PRACH to transmit its setting of its open loop power control to the base station 122. Incorrect data in the PRACH preamble or problems with the signal quality may cause missed connections, disrupt the capacity of the cell and/or prevent response from the base station 122.

Figure 1B:
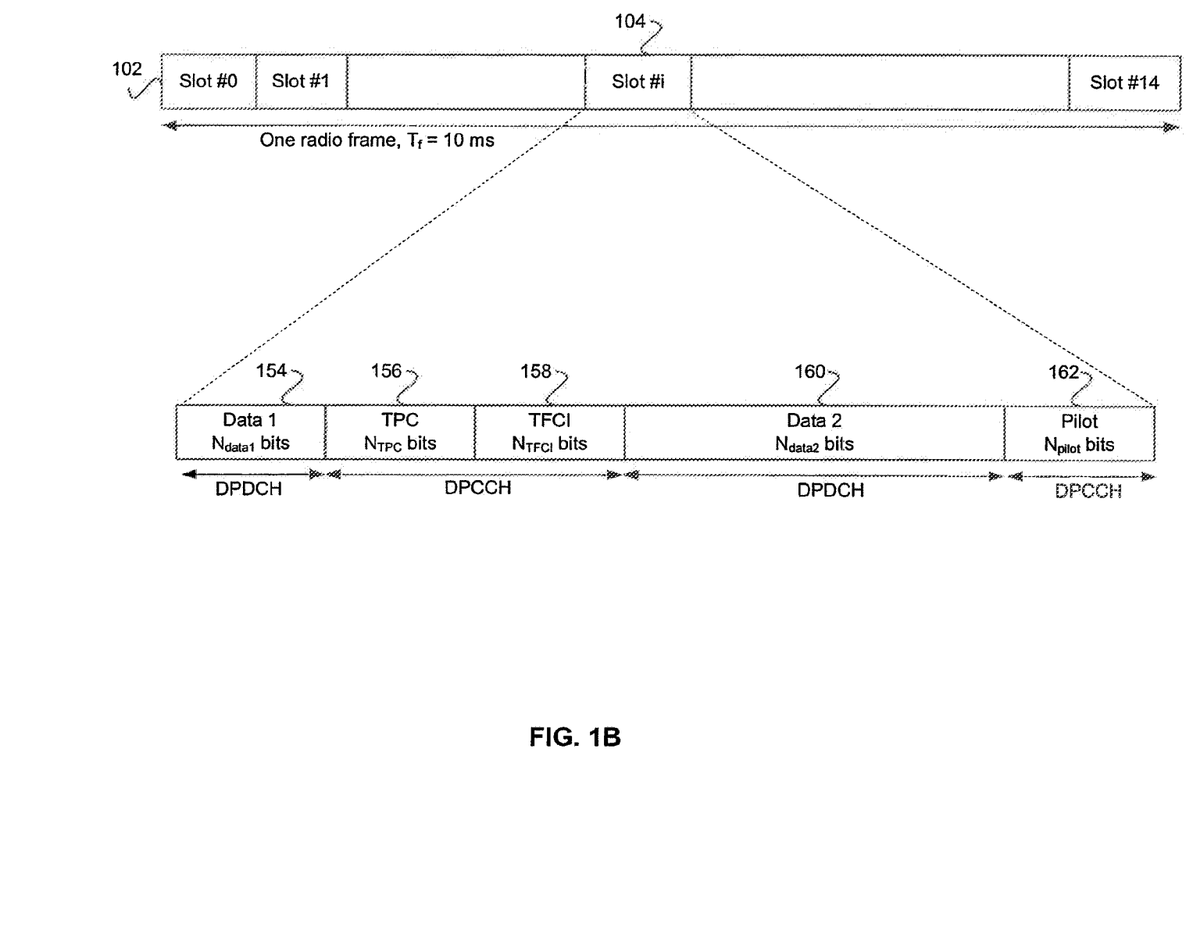
FIG. 1B is a block diagram of an exemplary radio frame format of a downlink dedicated physical channel (DPCH), in accordance with an embodiment of the invention.

FIG. 1B is a block diagram of an exemplary radio frame format of a downlink dedicated physical channel (DPCH), in accordance with an embodiment of the invention. Referring to FIG. 1B, there is shown a radio frame format 102, with a time period $T_f$ equal to 10 ms, for example. The radio frame 102 may comprise a plurality of slots, for example, 15 slots. Each of the slots in the radio frame 102, for example, slot # i 104 may comprise a plurality of dedicated physical data channels (DPDCH) and a plurality of dedicated physical control channels (DPCCH). The time period of each slot in the radio frame 102, for example, time period of slot # i may be equal to $10*2^k$ bits, where k=0 . . . 7, for example.

The DPDCH is a type of downlink channel, which may be represented as an I/Q code multiplexed within each radio frame 102. The downlink DPDCH may be utilized to carry data, for example, data 1 154 comprising $N_{data1}$ bits and data 2 160 comprising $N_{data2}$ bits. There may be zero, one, or a plurality of downlink dedicated physical data channels on each radio link.

The DPCCH is a type of downlink channel, which may be represented as an I/Q code multiplexed within each radio frame 102. The downlink DPCCH may be utilized to carry control information generated at the physical layer. The control information may comprise a transmit power control (TPC) block 156 comprising $N_{TPC}$ bits per slot, a transport format combination indicator (TFCI) block 158 comprising $N_{TFCI}$ bits per slot and a pilot block 162 comprising $N_{pilot}$ bits per slot.

The pilot bits 162 are known a priori, that is, they are known when received by a receiver. The term "a priori" means "formed or conceived beforehand." Therefore, conventional methods of computing a signal-to-noise ratio (SNR) metric are based on multiplying the received signal by a known sequence and thereafter computing a mean and variance of the received signal. These conventional methods, however, result in a biased estimate of the noise power. Such biased estimates are often times inaccurate.

In an embodiment of the invention, the quality and/or the noise power of the downlink control channel transmitted with the downlink dedicated physical channel (DPCH) may be determined. Within one downlink DPCH, dedicated data may be transmitted in a time-multiplex manner with control information. The control information may comprise pilot bits, transport format combination indicator (TFCI) bits and/or transmit power control (TPC) bits.

Figure 2A:
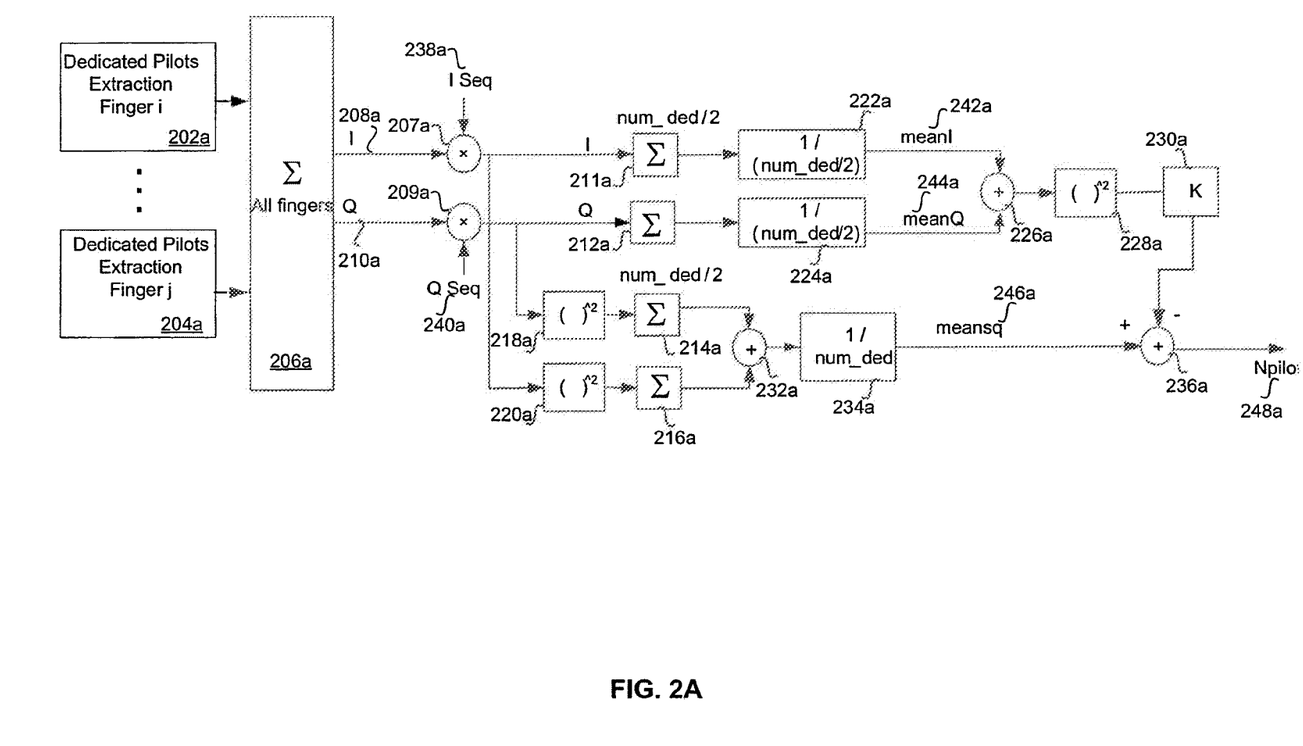
FIG. 2A is a block diagram illustrating determination of a noise power estimate in a WCDMA network, which may be used in accordance with an embodiment of the invention.

FIG. 2A is a block diagram illustrating determination of a noise power estimate in a WCDMA network, which may be used in accordance with an embodiment of the invention. Referring to FIG. 2A, there is shown a plurality of pilot extraction fingers for a given radio link (RL), for example, pilot extraction finger i 202a through pilot extraction finger j 204a, summing blocks 206a, 211a, . . . , 216a, 226a, 232a, and 236a. There is also shown multiplying blocks 207a, 209a, 230a, squaring blocks 218a, 220a, 228a, and divider blocks 222a, 224a, and 234a.

In a multipath-fading environment, a receiver structure, such as the structure illustrated in FIG. 2A, may assign fingers to the multiple received paths, for example, pilot extraction finger i 202a and pilot extraction finger j 204a. Those fingers belonging to the same radio link (RL) set may be summed by the summing block 206a to generate pilot I sum 208a and pilot Q sum 210a. A noise power estimate may be computed utilizing the pilot bits.

Within a wireless communication network, a received wireless signal may be modeled as a stationary random variable. From statistical theory, it follows that if x is a random variable, then its variance $\sigma_x$ may be computed utilizing the following equation:

$$\sigma_x^2 = E[(x-E[x])^2] = E[x^2] - (E[x])^2 \quad (1.)$$

Consequently, the noise power of a received signal may be computed by estimating the variance of the received signal.

In operation, pilot bits from all fingers 202a, . . . , 204a may be summed by the summing block 206a. The resulting pilot Q sum 210a and the pilot I sum 208a may be communicated to the multiplying blocks 209a and 207a, respectively. In circumstances when non-diversity flat fading is present, the soft value of each of the dedicated pilot bits at each slot may be obtained from the receiving user equipment utilizing a dedicated DPCH control message. The i-th pilot symbol may be represented by the following equation:

$$z_i = \sqrt{\frac{S_{DED}}{2}} (ISeq + jQSeq)|h|^2 + n_i h^*, \quad (2.)$$

where $S_{DED}$ comprises the transmit signal power, ISeq and QSeq comprise transmitted I and Q sequences, Iseq+jQSeq comprises a pilot symbol, h comprises the channel gain at the finger i, and $n_I$ comprises the noise of the signal received at the user equipment. The number of dedicated pilot bits per slot may be denoted by num_ded, which may result in num_ded/2 pilot symbols per slot.

Referring to FIG. 2A, the pilot I sum 208a and the pilot Q sum 210a communicated from the summing block 206a, may be expressed using the following equations:

$$I = \sqrt{\frac{S_{DED}}{2}} ISeq|h|^2 + \text{Re}(n_i h^*) \text{ and} \quad (3.)$$

$$Q = \sqrt{\frac{S_{DED}}{2}} QSeq|h|^2 + \text{Im}(n_i h^*)$$

After the pilot I sum 208a and the pilot Q sum 210a are generated by the summing block 206a, each pilot sum 208a and 210a may be multiplied by its own sequence I Seq 238a and Q Seq 240a, respectively, to remove phase rotation, using the multiplying blocks 207a and 209a. The I and Q post-derotation components may be expressed using the following equations:

$$I = \sqrt{\frac{S_{DED}}{2}} |h|^2 + \text{Re}(n_i h^*) ISeq = \sqrt{\frac{S_{DED}}{2}} |h|^2 + n_I, \text{ and} \quad (4.)$$

$$Q = \sqrt{\frac{S_{DED}}{2}} |h|^2 + \text{Im}(n_i h^*) QSeq = \sqrt{\frac{S_{DED}}{2}} |h|^2 + n_Q,$$

where $n_I$ and $n_Q$ comprise the noise components on the I and Q branches, for which power may be estimated.

In one embodiment of the invention, the noise power estimate may be calculated using the subtraction of the mean of the received signal to the square $(E[x])^2$ from the mean of the received signal power $E[x^2]$. The I and Q post-derotation components may be summed by the summing blocks 211a and 212a, respectively, over num_ded/2. The summed I and Q post-derotation components may then be normalized by the divider blocks 222a and 224a, respectively. For example, the divider blocks 222a and 224a may divide the summed I and Q post-derotation components by num_ded/2 to achieve normalization. The outputs of the divider blocks 222a and 224a may be denoted as meanI 242a and meanQ 244a and may be expressed using the following equations:

$$meanI = \sqrt{\frac{S_{DED}}{2}} |h|^2 + \frac{1}{\text{num\_ded}/2} \sum_i n_I(i) \text{ and} \quad (5.)$$

$$meanQ = \sqrt{\frac{S_{DED}}{2}} |h|^2 + \frac{1}{\text{num\_ded}/2} \sum_i n_Q(i)$$

Referring back to equation (1), the mean of the received signal to the square $(E[x])^2$ may be computed using the following equation:

$$(E[x])^2 = K \cdot (meanI + meanQ)^2, \quad (6.)$$

where K may comprise a scaling factor, which may be based on a hardware constant. The computation of $(meanI+meanQ)^2$ may be performed by the summing block 226a and the squaring block 228a, and the multiplication by the scaling factor K may be performed by the multiplying block 230a.

The I and Q post-derotation components may be squared by the squaring blocks 218a and 220a, respectively. The squared components may be expressed by the following equations:

$$I^2 = \left(\sqrt{\frac{S_{DED}}{2}}|h|^2 + n_I\right)^2 \text{ and}$$ (7.)

$$Q^2 = \left(\sqrt{\frac{S_{DED}}{2}}|h|^2 + n_Q\right)^2$$

The squared components $I^2$ and $Q^2$ may be summed by the summing blocks 214a and 216a, respectively, over num_ded/2. The summed squared components may then be combined by the summing block 232a. The combined output of the summing block 232a may be normalized by the divider block 234a. For example, the divider block 234a may divide the combined output of the summing block 232a by num_ded to achieve normalization, thereby generating the mean meansq 246a of the received signal power $E[x^2]$. The means 246a may be expressed using the following equation:

$$meansq = \frac{1}{num\_ded}\left(\sum_{i=1}^{num\_ded/2} I^2(i) + \sum_{i=1}^{num\_ded/2} Q^2(i)\right)$$ (8.)

Referring again to equation (1), the mean of the received signal power $E[^2]$ may be computed using the following equation:

$$E[x^2] = meansq$$ (9.)

In addition, it may follow from equation (1) that noise power may be calculated by subtracting the mean of the received signal to the square $(E[x])^2$ from the mean of the received signal power $E[x^2]$, using the summing block 236a. In this regard, the noise power estimate Npilot 248a may be calculated using the following equation:

$$Npilot = meansq - K \cdot (meanI + meanQ)^2$$ (10.)

Figure 2B:
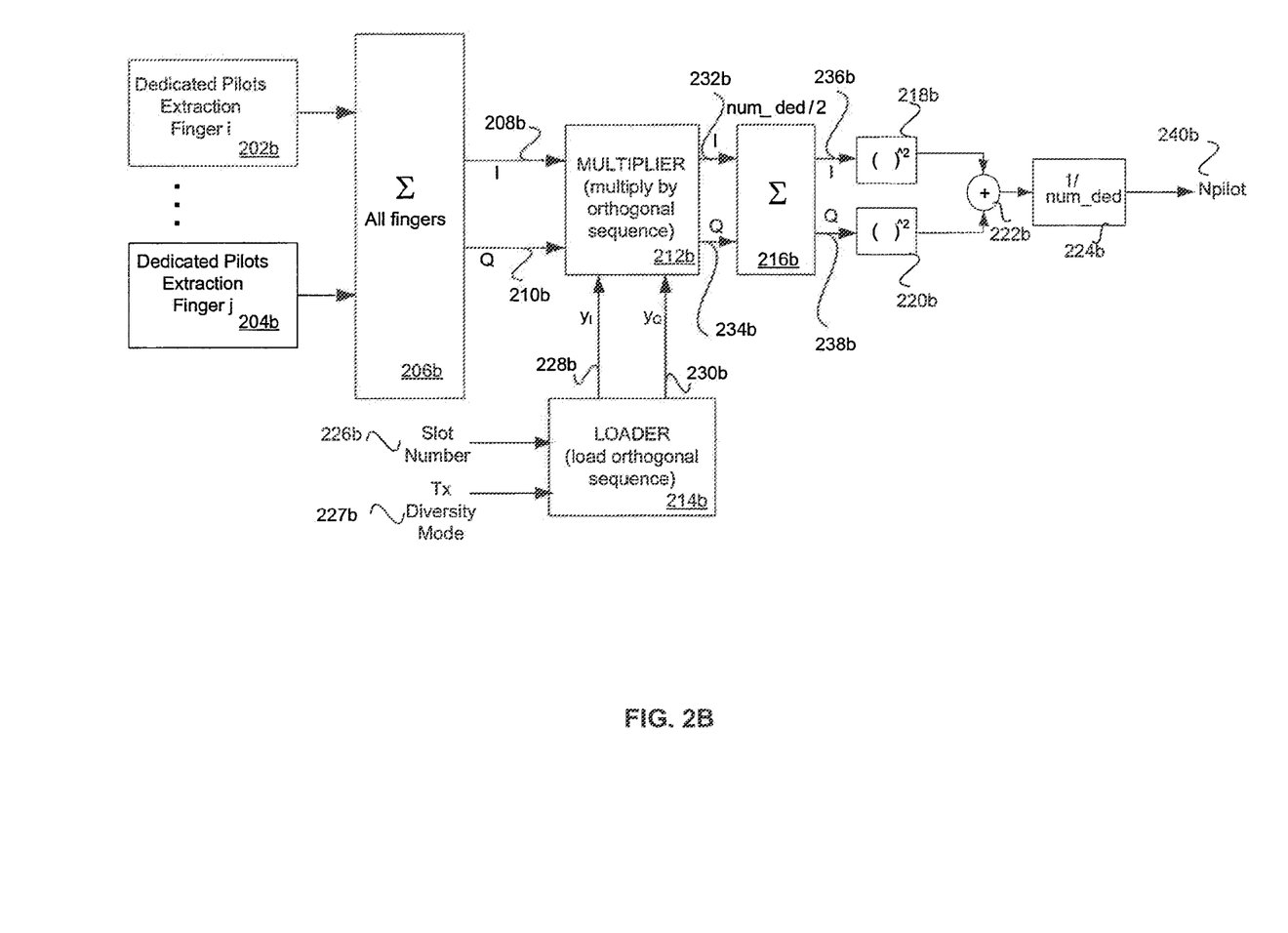
FIG. 2B is a block diagram illustrating determination of a noise power estimate in a WCDMA network utilizing an orthogonal sequence, in accordance with an embodiment of the invention.

FIG. 2B is a block diagram illustrating determination of a noise power estimate in a WCDMA network utilizing an orthogonal sequence, in accordance with an embodiment of the invention. Referring to FIG. 2B, there is shown a plurality of pilot extraction fingers for a given radio link (RL), for example, pilot extraction finger i 202b through pilot extraction finger j 204b, summing blocks 206b, 216b, and 222b. There is also shown a loading block 214b, a multiplying block 212b, squaring blocks 218b, 220b, and a divider block 224b.

In a multipath-fading environment, a receiver structure, such as the structure illustrated in FIG. 2B, may assign fingers to the multiple received paths, for example, pilot extraction finger i 202b at d pilot extraction finger j204b. Those fingers belonging to the same radio link (RL) set may be summed by the summing block 206b to generate pilot I sum 208b and pilot Q sum 210b. In one embodiment of the invention, a noise power estimate may be computed utilizing the pilot bits and one or more orthogonal sequences generated using a transmitted sequence of symbols. In a non-diversity flat fading case, the soft value of each of the dedicated pilot bits at each slot of a downlink channel may be obtained from the hardware and the i-th pilot symbol may be represented by the following equation:

$$z_i = \sqrt{\frac{S_{DED}}{2}} x_i |h|^2 + n_i h^*$$ (11.)

The number of dedicated pilot bits per slot may be denoted by num_ded and num_ded/2 dedicated pilot symbols may be stacked in a vector according to the following equation:

$$\underline{z} = \sqrt{\frac{S_{DED}}{2}}|h|^2 \underline{x} + \underline{n}',$$ (12.)

where n' may be the post-combining noise, the power of which may be estimated. The pilot symbol sequence $$\underline{x}^T = \left[x_0, x_1, x_2, \ldots, x_{\frac{num\_ded}{2}-1}\right]$$

may be known before a sequence is received. In this regard, an orthogonal sequence $$\underline{y}^T = \left[y_0, y_1, y_2, \ldots, y_{\frac{num\_ded}{2}-1}\right]$$

may be calculated such that $$\underline{y}^H \underline{x} = 0.$$ (13.)

Since the pilot symbols comprise −1s and 1s, the sequence in $\underline{y}$ may also comprise −1s and 1s.

Multiplying the received symbols $\underline{z}$ by $\underline{y}^H$ may result in a sign change manipulation on the received I and Q, so that the following equation may be satisfied:

$$\underline{y}^H \underline{z} = \underline{y}^H \underline{n}'$$ (14.)

The variance of the noise component n' may be expressed by the following equation:

$$\sigma_{n'}^2 = |h|^2 I_{oc} = E[n'_i n'^*_i], i = 0, \ldots, \frac{num\_ded}{2} - 1.$$ (15.)

Where $I_{oc}$ may be the power spectral density of a band limited white noise source (simulating interference from cells) as measured at the UE antenna connector. In instances when the orthogonal sequence $\underline{y}$ may be normalized, the following equation may be satisfied:

$$\underline{y}^H \underline{y} = 1.$$ (16.)

In this regard, the variance of $\underline{y}^H \underline{n}'$ may be expressed by the following equation:

$$\hat{N}_{pilot} = E[\underline{y}^H \underline{n}' \underline{n}'^H \underline{y}] = \sigma_{n'}^2 = |h|^2 I_{oc}$$ (17.)

Referring to FIG. 2B, the loading block 214b may determine one or more orthogonal sequences, such as the orthogonal sequences 228b and 230b, based on a slot number information 226b and transmit diversity mode information 227b. For example, different orthogonal sequences may be generated for closed loop 1 (CL1) transmit diversity mode. The generated one or more orthogonal sequences may be communicated to the multiplying block 212b. The generated I component 208b and the generated Q component 210b may be multiplied by the one or more orthogonal sequences, such as the orthogonal sequences 228b and 230b, to remove the signal component and generate at least one noise I component 232b and at least one noise Q component 234b.

The at least one noise I component 232b and the at least one noise Q component 234b may be summed by the summing block 216b to generate at least one summed noise I component 236b and at least one summed noise Q component 238b. The at least one summed noise I component 236b and the at least one summed noise Q component 238b may be squared by the squaring blocks 218b and 220b to generate at least one squared noise I component and at least one squared noise Q component. The at least one squared noise I component and the at least one squared noise Q component may be summed by the summing block 222b to generate a summed noise component. The summed noise component may then be normalized by the divider block 224b to determine a noise power estimate Npilot 240b for the downlink channel.

In a flat fading STTD environment with the number of pilot bits greater than 2, the soft value of each dedicated pilot bits at each slot may be obtained from the hardware. The i-th received dedicated pilot symbol for antenna 1 may be equal to:

$$z_{1i} = \sqrt{\frac{S_{DED}}{4}} (x_{1i}h_1 + x_{2i}h_2)h_1^* + n_i h_i^* \quad (18.)$$

Similarly, for antenna 2, $$z_{2i} = \sqrt{\frac{S_{DED}}{4}} (x_{1i}h_1 + x_{2i}h_2)h_2^* + n_i h_2^* \quad (19.)$$

The set of num_ded/2 dedicated pilot symbols may be stacked in a vector according to the following equations:

$$z_1 = \sqrt{\frac{S_{DED}}{4}} (\underline{x}_1 h_1 + \underline{x}_2 h_2) h_1^* + \underline{n}_1' \quad (20.)$$

$$z_1 = \sqrt{\frac{S_{DED}}{4}} (\underline{x}_1 |h_1|^2 + \underline{x}_2 h_2 h_1^*) + \underline{n}_1' \quad (21.)$$

$$z_1 = \sqrt{\frac{S_{DED}}{4}} [\underline{x}_1 \ \underline{x}_2] \begin{bmatrix} |h_1|^2 \\ h_2 h_1^* \end{bmatrix} + \underline{n}_1' \quad (22.)$$

and $$z_2 = \sqrt{\frac{S_{DED}}{4}} [\underline{x}_1 \ \underline{x}_2] \begin{bmatrix} h_1 h_2^* \\ |h_2|^2 \end{bmatrix} + \underline{n}_2' \quad (23.)$$

The pilot symbol sequences and $\underline{x}_1$ and $\underline{x}_2$ may be known before a sequence is received and an orthogonal sequence $\underline{y}^T$ may be calculated by the loading block 214b so that the following equations may be satisfied:

$$\underline{y}^H \underline{x}_1 0 \text{ and } \underline{y}^H \underline{x}_2 = 0 \quad (24.)$$

$$\underline{y}^H \underline{z}_1 = \underline{y}^H \underline{n}_1' \text{ and } \underline{y}^H \underline{z}_2 = \underline{y}^H \underline{n}_2' \quad (25.)$$

In an embodiment of the invention, a unique orthogonal sequence $\underline{y}^T$ may be calculated so that it is orthogonal to both pilot symbol sequences $\underline{x}_1$ and $\underline{x}_2$ at the same time. The variance of the noise component $\underline{n}_1'$ may be expressed using the following equations:

$$\sigma_{n_1'}^2 = |h_1|^2 I_{oc} = E[n_{1i}' n_{1i}'^*], \quad (26.)$$

$$i = 0, \ldots, \frac{num\_ded}{2} - 1$$

and $$\sigma_{n_2'}^2 = |h_2|^2 I_{oc} \quad (27.)$$

In instances when the orthogonal sequence $\underline{y}$ may be normalized by the divider block 224b, the following equation may be satisfied:

$$\underline{y}^H \underline{y} = 1 \quad (28.)$$

Then the variance of $\underline{y}^H \underline{n}_1'$ may be expressed by the following equation:

$$E[\underline{y}^H \underline{n}_i' \underline{n}_i'^H \underline{y}] = \sigma_{n_1}'^2, i=1,2 \quad (29.)$$

Therefore, the noise power Npilot 240b from the dedicated pilot bits may be obtained using the following equation:

$$|\underline{y}^H \underline{z}_1|^2 + |\underline{y}^H \underline{z}_2|^2 = \sigma_{n_1}'^2 + \sigma_{n_2}'^2 = (|h_1|^2 + |h_2|^2) I_{oc} \quad (30.)$$

In instances when the number of pilot bits equals two, the two pilot bits broadcast by antenna 2 may precede the last two bits of the data field. The pilot bits are STTD-encoded with the data and thus need to be retrieved post-STTD decoding. The receive circuitry may be adapted to extract pilot bits at the output of the combiner 206b, post-STTD decoding. The pilot symbol obtained post-STTD decoding may be expressed by the equation:

$$z = \sqrt{\frac{S_{DED}}{4}} x_1 \sum_{m=1}^{2} |h_m|^2 + \sum_{m=1}^{2} h_m^* n_m \quad (31.)$$

where $x_1$ may be the known pilot symbol sent from antenna 1 and $$E\left[\left(\sum_{m=1}^{2} h_m^* n_m\right)^2\right] = \left(\sum_{m=1}^{2} |h_m|^2\right) I_{oc} \quad (32.)$$

$$pilotI = \text{Re}(z) = \sqrt{\frac{S_{DED}}{4}} I_{seq} \sum_{m=1}^{2} |h_m|^2 + \text{Re}\left(\sum_{m=1}^{2} h_m^* n_m\right)$$

$$pilotQ = \text{Im}(z) = \sqrt{\frac{S_{DED}}{4}} Q_{seq} \sum_{m=1}^{2} |h_m|^2 + \text{Im}\left(\sum_{m=1}^{2} h_m^* n_m\right) \quad (33.)$$

Pilot bits pilotI and pilotQ may then be multiplied by $I_{seq}$ and $Q_{seq}$, respectively, to remove phase rotation. The I and Q post-derotation components may then be used to calculate the noise power Npilot 240b using the following equations:

$$\sigma_n^2 = (pilotI - pilotQ)^2 \quad (34.)$$

and $\sigma_n^2 = (|h_1|^2 + |h_2|^2) I_{oc} \quad (35.)$

In a CL1 flat fading environment, the soft value of each dedicated pilot bit at each slot on a per-finger basis may be obtained using the following equations:

$$z_1 = \sqrt{\frac{S_{DED}}{4}} \begin{bmatrix} \underline{x}_1 & \underline{x}_2 \end{bmatrix} \begin{bmatrix} |h_1|^2 \\ wh_1^* h_2 \end{bmatrix} + \underline{n}_1' \quad (36.)$$

and $$z_2 = \sqrt{\frac{S_{DED}}{4}} \begin{bmatrix} \underline{x}_1 & \underline{x}_2 \end{bmatrix} \begin{bmatrix} |h_1|^2 \\ wh_1^* h_2 \end{bmatrix} + \underline{n}_2' \quad (37.)$$

The weight w may be calculated by firmware, so that the following equation may be satisfied:

$$z = z_1 + w^* z_2 = \sqrt{\frac{S_{DED}}{4}} \begin{bmatrix} \underline{x}_1 & \underline{x}_2 \end{bmatrix} \begin{bmatrix} |h_1|^2 + w^* h_1 h_2^* \\ wh_1^* h_2 + |w|^2 |h_2|^2 \end{bmatrix} + \underline{n}_1' + w^* \underline{n}_2' \quad (38.)$$

The multiplying block 212b may be used to multiply $\underline{z}$ by the orthogonal sequence $\underline{y}$, resulting in the following equations:

$$\underline{y}^H \underline{z} = \underline{y}^H (\underline{n}_1' + w^* \underline{n}_2') \quad (39.)$$

$$\underline{y}^H \underline{z} = \underline{y}^H \left( \begin{bmatrix} n_0 h_1' \\ \vdots \\ n_{\frac{num\_ded}{2}-1} h_1^* \end{bmatrix} + w^* \begin{bmatrix} n_0 h_2^* \\ \vdots \\ n_{\frac{num\_ded}{2}-1} h_2^* \end{bmatrix} \right) \quad (40.)$$

and $$\underline{y}^H \underline{z} = \underline{y}^H \left( \begin{bmatrix} n_0 (h_1^* + w^* h_2^*) \\ \vdots \\ n_{\frac{num\_ded}{2}-1} (h_1^* + w^* h_2^*) \end{bmatrix} \right) = \underline{y}^H \underline{n}_{cl1} \quad (41.)$$

The variance of the noise component $n_{cl1}$ and determination of the noise power Npilot 240b may be expressed by the following equations:

$$\sigma_{n_{cl1}}^2 = \|h_1 + wh_2\|^2 I_{oc} = E[n_{cl1i} n_{cl1i}^*], \quad (42.)$$

$$i = 0, \ldots, \frac{num\_ded}{2} - 1$$

$$|\underline{y}^H \underline{z}|^2 = \sigma_{n_{cl1}}^2 \quad (43.)$$

In a CL2 flat fading environment, the same pilot pattern may be used on both the antennas as illustrated above with regard to a CL1 environment. The soft value of each dedicated pilot bit at each slot on a per-finger basis may be obtained using the following equation:

$$z_{1i} = \sqrt{\frac{S_{DED}}{4}} (w_1 h_1 + w_2 h_2) x_i h_1^* + n_i h_1^* \quad (44.)$$

The dedicated pilot symbols num_ded/2 may be stacked in a vector according to the following equations:

$$z_1 = \sqrt{\frac{S_{DED}}{4}} (w_1 h_1 + w_2 h_2) \underline{x} h_1^* + \underline{n}_1' \quad (45.)$$

and $$z_2 = \sqrt{\frac{S_{DED}}{4}} (w_1 h_1 + w_2 h_2) \underline{x} h_2^* + \underline{n}_2' \quad (46.)$$

The weights $w_1$ and $w_2$ may be calculated, using for example, firmware so that the following equations may be satisfied:

$$z = w_1^* z_1 + w_2^* z_2 \quad (47.)$$

$$z = \sqrt{\frac{S_{DED}}{4}} \|w_1 h_2 + w_2 h_2\|^2 \underline{x} + w_1^* \underline{n}_1' + w_2^* \underline{n}_2' \quad (48.)$$

The multiplying block 212b may be used to multiply z by the orthogonal sequence $\underline{y}$, which may result in the following equation:

$$|\underline{y}^H \underline{z}|^2 = \sigma_{n_{cl2}} = \|w_1 h_1 + w_2 h_2\|^2 I_{oc} \quad (49.)$$

Equation (49) may then be utilized to determine the variance of the noise component and the noise power Npilot 240b.

Figure 3:
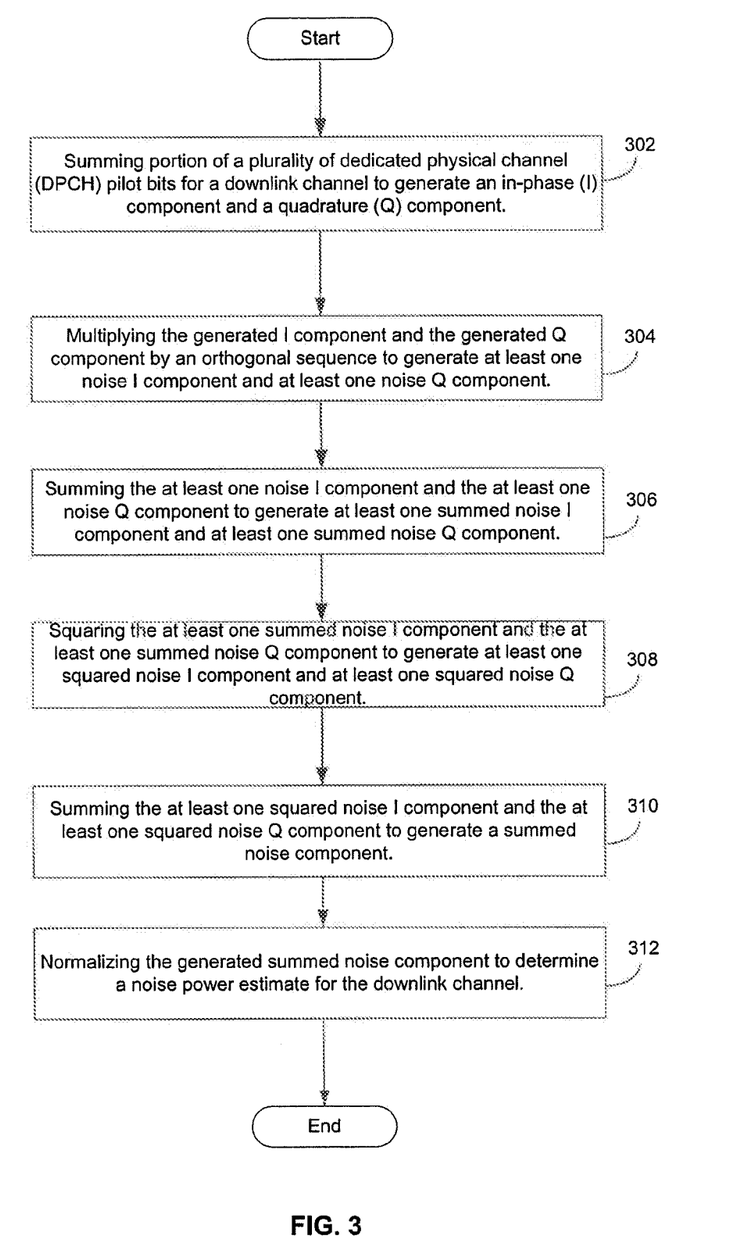
FIG. 3 is a flowchart illustrating exemplary steps for determining a noise power estimate in a WCDMA network, in accordance with an embodiment of the invention.

FIG. 3 is a flowchart illustrating exemplary steps for determining a noise power estimate in a WCDMA network, in accordance with an embodiment of the invention. Referring to FIGS. 2B and 3, at 302, portion of a plurality of dedicated physical channel (DPCH) pilot bits for a downlink channel may be summed by the summing block 206b to generate an in-phase (I) component 208b and a quadrature (Q) component 210b. The generated I component and the generated Q component may be multiplied by one or more orthogonal sequences, such as sequences 228b and 230b, to generate at least one noise I component 232b and at least one noise Q component 234b. The at least one noise I component 232b and the at least one noise Q component 234b may be summed by the summing block 216b to generate at least one summed noise I component 236b and at least one summed noise Q component 238b. The at least one summed noise I component 236b and the at least one summed noise Q component 238b may be squared by the squaring blocks 218b and 220b to generate at least one squared noise I component and at least one squared noise Q component. The at least one squared noise I component and the at least one squared noise Q component may be summed by the summing block 222b to generate a resulting summed noise component. The resulting summed noise component may be normalized by the divider block 224b to determine a noise power estimate Npilot 240b for the downlink channel.

Another embodiment of the invention may provide a machine-readable storage having stored thereon, a computer program having at least one code section for signal processing, the at least one code section being executable by a machine for causing the machine to perform steps as disclosed herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method comprising:
receiving a signal on a downlink channel, the received signal having been generated based, at least in part, on a sequence of control bits, wherein the sequence of control bits has an associated orthogonal bit sequence;
calculating a noise power estimate of the received signal by extracting noise components from an in-phase (I) component and a quadrature (Q) component associated with the received signal, wherein the noise components are extracted by multiplying the in-phase (I) component and the quadrature (Q) component by the orthogonal bit sequence; and
determining a signal-to-noise-ratio (SNR) based on the calculated noise power estimate.

2. The method according to claim 1, further comprising:
adjusting a power level based on the signal-to-noise-ratio (SNR).

3. The method according to claim 1, further comprising:
facilitating a handover based on the signal-to-noise-ratio (SNR).

4. The method according to claim 1, wherein said orthogonal bit sequence is generated based on a slot number of a radio frame of said received signal.

5. The method according to claim 1, wherein said orthogonal bit sequence is generated based on a transmit diversity mode used for transmitting said received signal.

6. The method according to claim 1, wherein the calculating further comprises summing at least a portion of the control bits for said downlink channel to generate said in-phase (I) component and said quadrature (Q) component.

7. The method according to claim 6, wherein said control bits comprise one or more of dedicated physical channel (DPCH) transmit power control (TPC) bits, DPCH pilot bits, and common pilot channel (CPICH) bits.

8. The method according to claim 6, wherein the calculating further comprises:
multiplying said generated I component and said generated Q component by said orthogonal bit sequence to generate at least one noise I component and at least one noise Q component;
summing said at least one noise I component and said at least one noise Q component to generate at least one summed noise I component and at least one summed noise Q component;
squaring said at least one summed noise I component and said at least one summed noise Q component to generate at least one squared noise I component and at least one squared noise Q component;
summing said at least one squared noise I component and said at least one squared noise Q component to generate a resulting summed noise component; and
normalizing said generated resulting summed noise component to determine a noise power estimate for said downlink channel.

9. The method according to claim 8, wherein said normalizing comprises:
dividing said generated resulting summed noise component by the at least the portion of control bits of said downlink channel.

10. A system for signal processing, the system comprising:
a receiver configured to receive a signal on a downlink channel, the received signal having been generated based, at least in part, on a sequence of control bits, wherein the sequence of control bits has an associated orthogonal bit sequence; and
circuitry that is configured to:
calculate a noise power estimate of the received signal by being configured to extract noise components from an in-phase (I) component and a quadrature (Q) component associated with the received signal, wherein the noise components are extracted by multiplying the in-phase (I) component and the quadrature (Q) component by the orthogonal bit sequence, and
determine a signal-to-noise-ratio (SNR) based on the calculated noise power estimate.

11. The system according to claim 10, wherein the circuitry is further configured to adjust a power level based on the signal-to-noise-ratio (SNR).

12. The system according to claim 10, wherein the circuitry is further configured to facilitate a handover based on the signal-to-noise-ratio (SNR).

13. The system according to claim 10, wherein said orthogonal bit sequence is generated based on a slot number of a radio frame of said received signal.

14. The system according to claim 10, wherein said orthogonal bit sequence is generated based on a transmit diversity mode used for transmitting said received signal.

15. The system according to claim 10, wherein said circuitry enables summing at least a portion of the control bits for said downlink channel to generate said in-phase (I) component and said quadrature (Q) component.

16. The system according to claim 15, wherein said control bits comprise one or more of dedicated physical channel (DPCH) transmit power control (TPC) bits, DPCH pilot bits, and common pilot channel (CPICH) bits.

17. Tile system according to claim 15, wherein said circuitry is further configured to:
   multiply said generated I component and said generated Q component by said orthogonal bit sequence to generate at least one noise I component and at least one noise Q component;
   sum said at least one noise I component and said at least one noise Q component to generate at least one summed noise I component and at least one summed noise Q component;
   square said at least one summed noise I component and said at least one summed noise Q component to generate at least one squared noise I component and at least one squared noise Q component;
   sum said at least one squared noise I component and said at least one squared noise Q component to generate a resulting summed noise component; and
   normalize said generated resulting summed noise component to determine a noise power estimate for said downlink channel.

18. The system according to claim 17, wherein said circuitry is further configured to divide said generated resulting summed noise component by the at least the portion of control bits of said downlink channel.

19. A system for signal processing, the system comprising:
   a receiver configured to receive a signal on an uplink channel, the received signal having been generated based, at least in part, on a sequence of control bits, wherein the sequence of control bits has an associated orthogonal bit sequence; and
   circuitry that is configured to calculate a noise power estimate of the received signal by being configured to extract noise components from an in-phase (I) component and a quadrature (Q) component associated with the received signal, Wherein the noise components are extracted by multiplying the in-phase (I) component and the quadrature (Q) component by the orthogonal bit sequence.

20. The system according to claim 19, wherein said circuitry is further configured to:
   determine a signal-to-noise-ratio (SNR) based on the calculated noise power estimate.

* * * * *

UNITED STATES PATENT AND TRADEMARK OFFICE
CERTIFICATE OF CORRECTION

| | | |
|---|---|---|
| PATENT NO. | : 8,755,333 B2 | Page 1 of 1 |
| APPLICATION NO. | : 13/620602 | |
| DATED | : June 17, 2014 | |
| INVENTOR(S) | : Landau et al. | |

It is certified that error appears in the above-identified patent and that said Letters Patent is hereby corrected as shown below:

In the Claims:

In column 14, line 37, claim 10, please delete "." before --A--.

In column 15, line 7, claim 17, please replace "Tile" with --The--.

Signed and Sealed this
Twenty-third Day of September, 2014

Michelle K. Lee
*Deputy Director of the United States Patent and Trademark Office*